United States Patent
Sutter

(10) Patent No.: US 10,374,950 B2
(45) Date of Patent: Aug. 6, 2019

(54) ROUTING TRAFFIC BETWEEN NETWORKS GOVERNED BY DIFFERENT VERSIONS OF THE INTERNET PROTOCOL

(71) Applicant: Red Hat, Inc., Raleigh, NC (US)

(72) Inventor: Phil Sutter, Bingen am Rhein (DE)

(73) Assignee: Red Hat, Inc., Raleigh, NC (US)

(*) Notice: Subject to any disclaimer, the term of this patent is extended or adjusted under 35 U.S.C. 154(b) by 127 days.

(21) Appl. No.: 15/053,011

(22) Filed: Feb. 25, 2016

(65) Prior Publication Data
US 2017/0250910 A1 Aug. 31, 2017

(51) Int. Cl.
*H04L 12/28* (2006.01)
*H04L 12/749* (2013.01)
*H04L 29/12* (2006.01)

(52) U.S. Cl.
CPC ........ *H04L 45/741* (2013.01); *H04L 61/1511* (2013.01); *H04L 61/251* (2013.01); *H04L 61/6059* (2013.01)

(58) Field of Classification Search
CPC ..... H04L 45/741; H04L 41/22; H04L 61/1511
USPC ........................................................ 370/392
See application file for complete search history.

(56) References Cited

U.S. PATENT DOCUMENTS

| | | | | |
|---|---|---|---|---|
| 6,038,233 A | * | 3/2000 | Hamamoto | H04L 29/12009 370/401 |
| 7,385,983 B2 | | 6/2008 | Chen et al. | |
| 7,391,768 B1 | * | 6/2008 | Samprathi | H04L 29/12358 370/389 |

(Continued)

FOREIGN PATENT DOCUMENTS

| | | |
|---|---|---|
| CN | 101969698 A | 2/2011 |
| DE | 102004057657 A1 | 11/2006 |

OTHER PUBLICATIONS

Atwood, J.W., et al., "NAT-PT: Providing IPv4/IPv6 and IPv6/IPv4 Address Translation", 10 Pages http://kambing.ui.ac.id/onnopurbo/library/library-sw-hw/linux-howto/ipv6/v4_v6_translation.pdf (Last accessed Feb. 11, 2016).

(Continued)

*Primary Examiner* — Mang Hang Yeung
(74) *Attorney, Agent, or Firm* — Lowenstein Sandler LLP

(57) ABSTRACT

Systems and methods for routing traffic between networks governed by different Internet Protocol (IP) versions. An example method may comprise: receiving a network packet having an original source address defined in a first address space and an original destination address defined in the first address space, wherein the first address space is associated with a first Open Systems Interconnection (OSI) network layer protocol; identifying, using a network layer address mapping transformation, a new destination address associated with the original destination address, wherein the new destination address is defined in a second address space associated with a second OSI network layer protocol; substituting the original destination address of the network packet with the new destination address; selecting, from a pool of available network layer addresses defined in the second address space, a new source address; substituting the original source address of the network packet with the new source address; and causing the network packet to be transmitted to a destination host identified by the new destination address.

16 Claims, 4 Drawing Sheets

(56) References Cited

U.S. PATENT DOCUMENTS

| | | | |
|---|---|---|---|
| 7,526,562 B1* | 4/2009 | Samprathi | H04L 29/12066 370/466 |
| 7,600,026 B2 | 10/2009 | Chen et al. | |
| 8,228,942 B2 | 7/2012 | Mo | |
| 8,451,797 B2 | 5/2013 | Buddhikot et al. | |
| 2002/0159461 A1* | 10/2002 | Hamamoto | H04L 29/12358 370/392 |
| 2008/0263353 A1* | 10/2008 | Droms | H04L 29/12283 713/153 |
| 2013/0232278 A1* | 9/2013 | Zou | H04L 61/251 709/245 |

OTHER PUBLICATIONS

"FreeBSD Man Pages", freebsd.org, FreeBSD 10.3, Aug. 2, 2011, 6 pages https//www.freebsd.org/cgi/man.cgi48 query=faithd&sektion=8.

Hagino, J., and Yamamoto, K., "An IPv6-to-IPv4 Transport Relay Translator", ietf.org, The Internet Society, Jun. 2001, pp. 1-11 https://www.ietf.org/rfc/rfc3142.txt.

"NAT PT Documentation" documents.mx, Oct. 25, 2014, 6 pages http://documents.mx/documents/nat-pt-doumentation.html.

Nordmark, E. "Stateless IP/ICMP Translation Algorithm (SIIT)", ietf.org, The Internet Society, Feb. 2000, pp. 1-25 https://www.ietf.org/rfc/rfc2765.txt.

Tsirtsis, George and Srisuresh, Pyda, "Network Address Translation—Protocol Translation (NAT-PT)", BT Laboratories; Lucent Technologies, Feb. 1999, 14 Pages https://www.ietf.org/proceedings/44/I-D/draft-ietf-ngtrans-natpt-05.txt.

Wing, Dan and Ward, David, "A Comparison of Proposals to Replace NAT-PT", Cisco Systems, Inc, 2008, 19 Pages https://tools.ietf.org/id/draft-wing-nat-pt-replacement-comparison-00.xml#rfc.section.4.1.

Zhang, Kimi, "IPv4 to IPv6 static NAT-PT by Linux box Running NAPTD", kimizhang.com, Jan. 26, 2016, 3 Pages http://kimizhang.com/ipv4-to-ipv6-static-nat-pt-by-linux-box-running-naptd/.

* cited by examiner

ROUTING TRAFFIC BETWEEN NETWORKS GOVERNED BY DIFFERENT VERSIONS OF THE INTERNET PROTOCOL

TECHNICAL FIELD

The present disclosure relates to virtual router management, and more particularly, to interconnecting networks governed by different versions of the Internet Protocol (IP).

BACKGROUND

Internet Protocol version 6 (IPv6) is the most recent version of the Internet Protocol (IP), the communications protocol that provides an identification and location system for computers on networks and routes traffic across the Internet. IPv6 addresses are represented as eight groups of four hexadecimal digits with the groups being separated by colons, for example 2001:0db8:0000:0042:0000:8a2e:0370: 7334. Several methods exist to abbreviate this full notation.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for routing traffic between networks governed by different Internet Protocol (IP) versions.

Internet Protocol Version 6 (IPv6) is an Open Systems Interconnection (OSI) layer 3 (network layer) protocol for packet-switched internetworking and provides end-to-end packet transmission across multiple IP networks, closely adhering to the design principles developed in the previous version of the protocol, Internet Protocol Version 4 (IPv4). However, IPv6 does not specify interoperability features with IPv4, but essentially creates a parallel, independent network. Therefore, routing traffic between IPv4 and IPv6 networks may require implementing custom gateways interconnecting such networks.

"Router" herein shall refer to a computer system equipped with at least two network interfaces and employed for network layer packets between the networks connected to the respective network interfaces.

"Network address translation" (NAT) herein shall refer to methods of substituting network layer addresses in packet headers according to a configurable set of rules. In an illustrative example, NAT may be employed for implementing masquerading, which is a technique that hides a network behind a single network layer address in a different network address space.

The methods and systems disclosed herein facilitate the connectivity and certain other related network services for an IPv6 network with respect to an IPv4 network (such as the Internet), by providing a kernel mode network address translation module functioning as described in more details herein below.

Various aspects of the above referenced methods and systems are described in details herein below by way of example, rather than by way of limitation.

Figure 1:
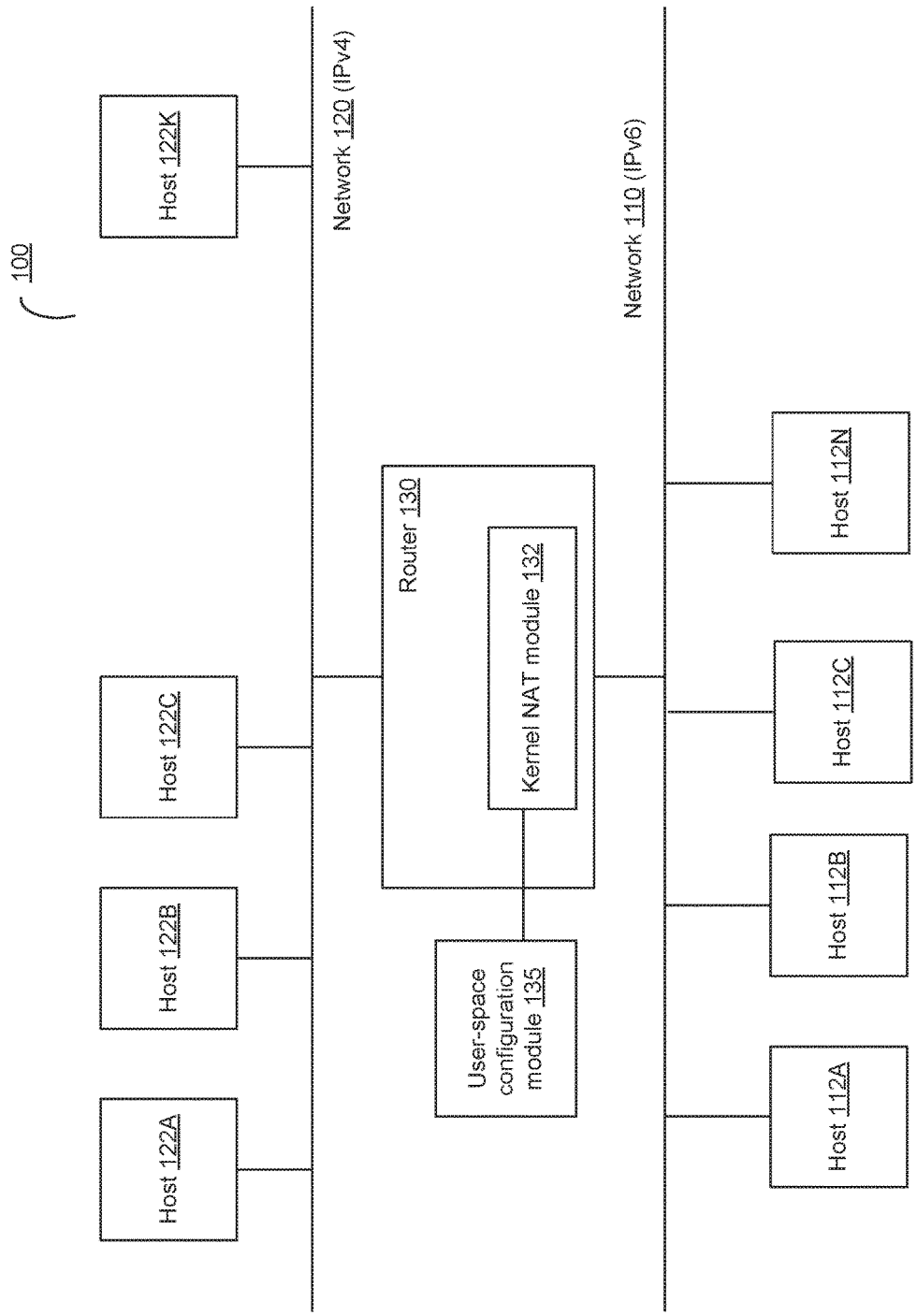
FIG. 1 depicts a high-level network diagram of an example distributed computer system 100 in which the systems and methods for routing traffic between networks governed by different Internet Protocol (IP) versions may be implemented, in accordance with one or more aspects of the present disclosure.

FIG. 1 depicts a high-level network diagram of an example distributed computer system 100 in which the systems and methods for routing traffic between networks governed by different Internet Protocol (IP) versions may be implemented, in accordance with one or more aspects of the present disclosure. As schematically illustrated by FIG. 1, distributed computer system 100 may comprise a plurality of interconnected networks, including a first network 110 and a second network 120 which may be governed by different IP versions. In an illustrative example, network 110 may be governed by IPv6, while network 120 may be governed by IPv4 and may represent the Internet. Each network 110 and 120 may be associated with respective pluralities of hosts 112A-112N and 122A-122K. Networks 110 and 120 may be interconnected by a router 130, which may include a kernel mode network address translation module 132 operating in accordance with one or more aspects of the present disclosure. Each of networks 110 and 120 may comprise one or more interconnected network segments and/or other components governed by the corresponding IP version, however, such network segments and components are omitted from FIG. 1 for clarity.

In an illustrative example, host 112A residing on IPv6 network 110 may need to transmit an HTTP request to an HTTP server 122A residing on the Internet 120. The request may identify the HTTP server by its domain name. Accordingly, before transmitting the HTTP request, host 112A would need to resolve the domain name into a corresponding network layer address. However, since source host 112A and destination host 122A have their respective network interfaces on networks 110 and 120, which are governed by different IP versions, an attempt by host 112A to send a network packet to the network layer address associated with host 122A would result in a "destination host unreachable" exception thrown by the Transmission Control Protocol/Internet Protocol (TCP/IP) stack of source host 112A.

In order to facilitate network traffic between networks 110 and 120, router 130 may implement a kernel mode network address translation module 132 which substitutes source and destination networks addresses in network packets flowing between networks 110 and 120. A user space module 135 may be employed for configuring the NAT rules that are implemented by kernel mode NAT module 132 (e.g., via a graphical user interface (GUI) or via an application programming interface (API)). Furthermore, a customized Domain Name System (DNS) server 115 may be implemented for resolving network names to network layer addresses on behalf of hosts associated with network 110, as described in more details herein below.

In an illustrative example, host 112A residing on network 110 may transmit a DNS request for a network layer address associated with a domain name www.example-host.com. DNS server 115 may resolve the request using its cache or by forwarding the DNS request to an upstream DNS server (omitted from FIG. 1 for clarity). Responsive to identifying an IPv4 network layer address associated with host 122A, DNS server 115 may then determine a dummy IPv6 address to be returned to the requesting host 112A, so that from the requesting host's perspective, the destination host would appear as being connected to a network governed by the same version of IP protocol (i.e., IPv6).

In certain implementations, DNS server 115 may produce the dummy IPv6 address to be returned to requesting host 112A by concatenating the IPv4 address associated with host 122A with a pre-defined address prefix and/or a pre-defined address suffix. In an illustrative example, DNS server 115 may append the IPv4 address associated with host 122A to a pre-defined 96-bit prefix. Alternatively, DNS server 115 may append the IPv4 address associated with host 122A to a pre-defined prefix having the size of less than 96 bits, and then append a pre-defined suffix to the concatenation of the prefix and the IPv4 address in order to bring the size of the resulting dummy IPv6 address to 128 bits. Alternatively, DNS server 115 may look up the IPv4 address associated with host 122A in a memory data structure associating destination IPv4 addresses with dummy IPv6 addresses. Alternatively, DNS server 115 may implement other methods of associating a dummy IPv6 address with the IPv4 address of target host 122A.

Upon receiving the DNS response, source host 112A may transmit, to its default gateway represented by router 130, a network packet addressed to the dummy IPv6 address specified by the DNS response. Kernel mode NAT module 132 of router 130 may implement a NAT scheme described herein below with reference to FIG. 2.

Figure 2:
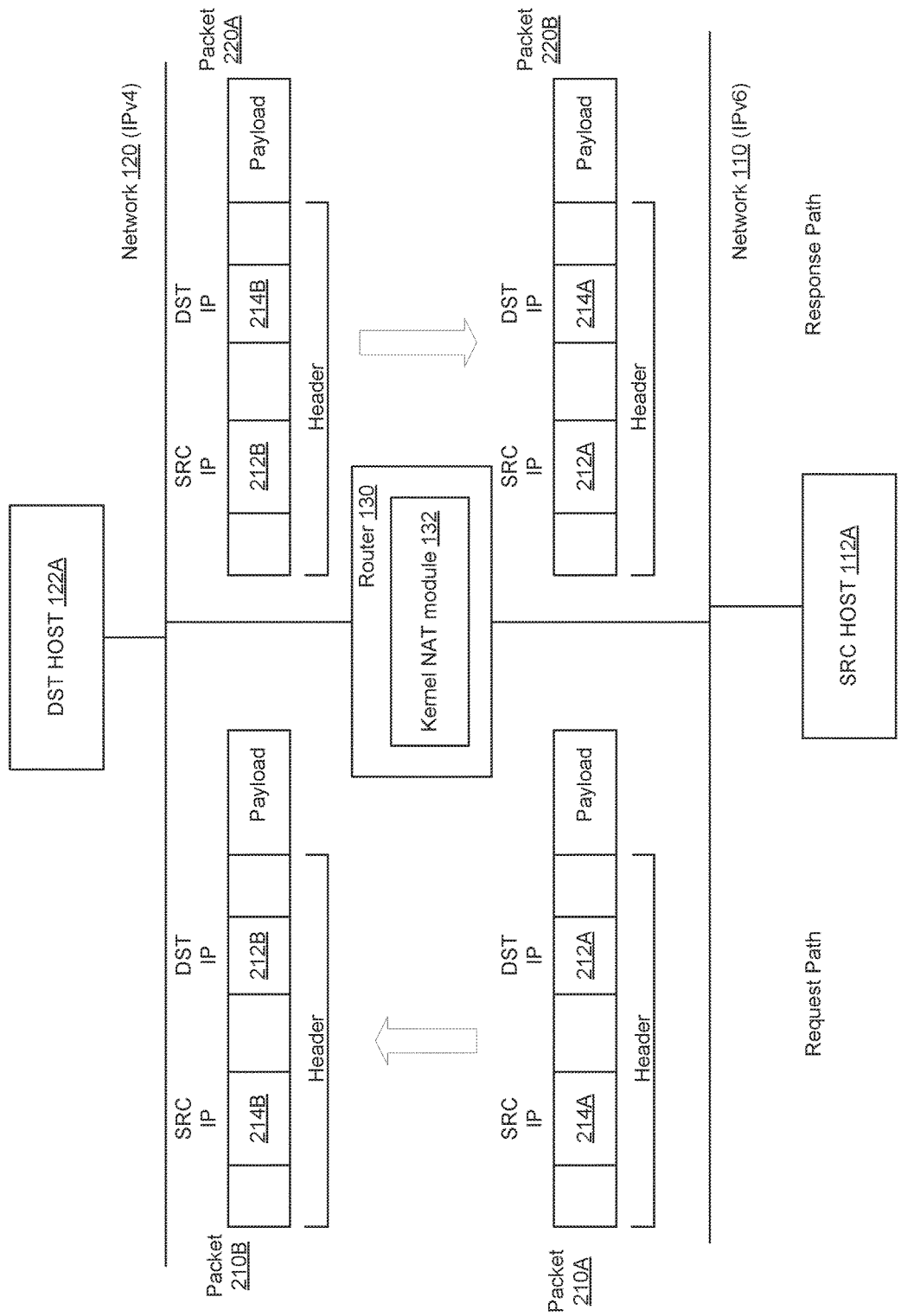
FIG. 2 schematically illustrates an example network address translation (NAT) scheme implemented by a kernel mode NAT module operating in accordance with one or more aspects of the present disclosure.

FIG. 2 schematically illustrates an example NAT scheme implemented by kernel mode NAT module 132 for forwarding network packets between networks 110 and 120, by substituting network layer addresses in the headers of packets flowing through router 130. In accordance with the example NAT scheme, router 130 may, responsive to receiving, from source host 112A, a network packet 210A addressed to the dummy IPv6 address 212A that was specified by the DNS response, invoke kernel mode NAT module 132 for identifying an IPv4 address 212B corresponding to dummy IPv6 address 212A. In certain implementations, kernel mode NAT module 132 may be programmed to produce dummy IPv6 address 212A by reversing the above-described network address transformation that has been performed by DNS server 115. In an illustrative example, kernel mode NAT module 132 may determine the new destination (IPv4) address 212B by removing, from dummy IPv6 address 212A the pre-defined address prefix and/or the pre-defined address suffix. Alternatively, kernel mode NAT module 132 may look dummy IPv6 address 212A in a memory data structure associating destination IPv4 addresses with dummy IPv6 addresses. Kernel mode NAT module 132 may then substitute, in the destination address field of the packet header, dummy IPv6 address 212A with the identified IPv4 address 212B of destination host 122A.

Router 130 may further substitute, in the packet header, source address 214A with a dummy IPv4 address 214B. In certain implementations, router 130 may maintain a pool of dummy source IPv4 addresses to be utilized as the source addresses for the network packets forwarded by router 130 to IPv4 network 120. Responsive to receiving, from source host 112A, a network packet addressed to a host on IPv4 network 120, router 130 may identify a dummy IPv4 address to act as the source address for the packet.

In an illustrative example, router 130 may look up source IPv6 address 214A in a memory data structure associating source IPv6 addresses with dummy source IPv4 addresses. Responsive to locating a record mapping source IPv6 addresses 214A to a dummy source IPv4 address 214B, router 130 may use the identified IPv4 address 214B for substituting source network layer 214A; otherwise, router 130 may retrieve the next available IPv4 address from the pool of available dummy source IPv4 addresses and use the retrieved IPv4 address for substituting source network layer address 214A. Various strategies may be implemented by router 130 with respect to purging the records from the memory data structure associating source IPv6 addresses with dummy source IPv4 addresses. In an illustrative example, each record may be time-stamped at the time of record creation (for processing a first packet from the given source address) and/or retrieval (for processing subsequent packets from the given source address), and may be purged upon expiration of a given inactivity timeout with respect to the record's timestamp. Alternatively, mapping records may be created in the data structure in their natural chronological order, and the oldest record may be purged whenever the pool of available dummy source IPv4 addresses is found to be empty. Alternatively, a record may be purged responsive to detecting a higher-level protocol event associated with the corresponding source IPv4 address (e.g., the last existing Transmission Control Protocol (TCP) connection associated with the source IPv4 address having been explicitly terminated by one of the parties).

Once the address translation with respect to the source and destination addresses of the current packet has been completed, router 130 may route the translated network packet 210B to destination host 122A.

Responsive to receiving a response network packet 220A addressed by destination host 122A to source host 112A, kernel mode NAT module 132 may perform the reverse address substitutions, i.e., substitute the source network layer address 212B of the response packet with dummy IPv6 address 212A and further substitute the destination network layer address 214B of the response packet with the IPv6 address 214A of host 122A. Once the address translation has been performed, kernel mode NAT module 132 may route the translated response packet 220B to source host 112A. For performing the reverse transformation of the destination address of the response packet, kernel NAT module 132 may employ the above-described a memory data structure associating source IPv6 addresses with dummy source IPv4 addresses. For performing the reverse transformation of the source address of the response packet, kernel NAT module 132 may performed the above-described network address transformation that has been performed by DNS server 115 (e.g., concatenating the IPv4 address associated with host 122A with a pre-defined address prefix and/or a pre-defined address suffix, or looking up a memory data structure mapping IPv4 addresses to dummy IPv6 addresses). Alternatively, kernel NAT module 132 may log the address translation that has been performed for the request packet 210 that has been transmitted by source host 112A to destination host 122A, and then look up the address translation log for performing the reverse address translation for response packet 220.

In accordance with one or more aspects of the present disclosure, a relatively small (as compared to the number of hosts on IPv6 network 110) pool of IPv4 addresses may be utilized to provide the source addresses for the network packets originated by hosts on IPv6 network 110 and addressed to hosts on IPv4 network 120. In certain implementations, the same dummy IPv4 address may be used for multiple concurrent or overlapping sessions, in which case the connection tracking data structure would also need to record the source and/or destination TCP or UDP ports, in order to distinguish between the concurrent sessions initiated by different hosts.

Figure 3:
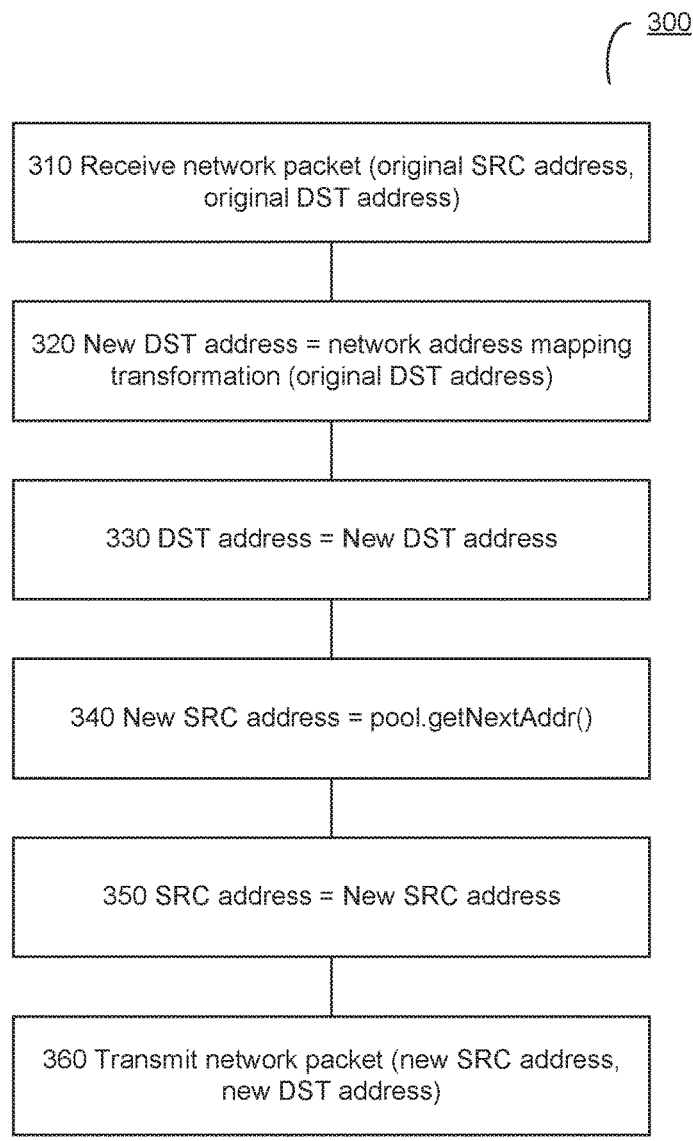
FIG. 3 depicts a flow diagram of a method of routing traffic between networks governed by different Internet Protocol (IP) versions, in accordance with one or more aspects of the present disclosure.

FIG. 3 depicts a flow diagram of one illustrative example of method 300 of routing traffic between networks governed by different Internet Protocol (IP) versions, in accordance with one or more aspects of the present disclosure. Method 300 and/or each of its individual functions, routines, subroutines, or operations may be performed by one or more processing devices of the computer system (e.g., host computer system 100 of FIG. 1) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a processing device of a network router implementing the method may receive a network packet having both the original source address and the original destination address defined in the first address space associated with the first network layer protocol (e.g., IPv6), as described in more details herein above.

At block 320, the processing device may apply, to the original destination address, a network address mapping transformation in order to identify a new destination address that is defined in the second address space associated with the second network layer protocol (e.g., IPv4). In certain implementations, parameters of the network address mapping transformation may be specified via a graphical user interface (GUI) or via an application programming interface (API) of a user-space module, as described in more details herein above.

At block 330, the processing device may substitute, in the packet header, the original destination address with the new destination address.

At block 340, the processing device may select, from a pool of available network layer addresses defined in the second address space associated with the second network layer protocol (e.g., IPv4), a new source address, as described in more details herein above.

At block 350, the processing device may substitute, in the packet header, the original source address of the network packet with the new source address.

At block 360, the processing device may cause the translated network packet to be transmitted to the destination host specified by the new destination address, and the method may terminate.

Figure 4:
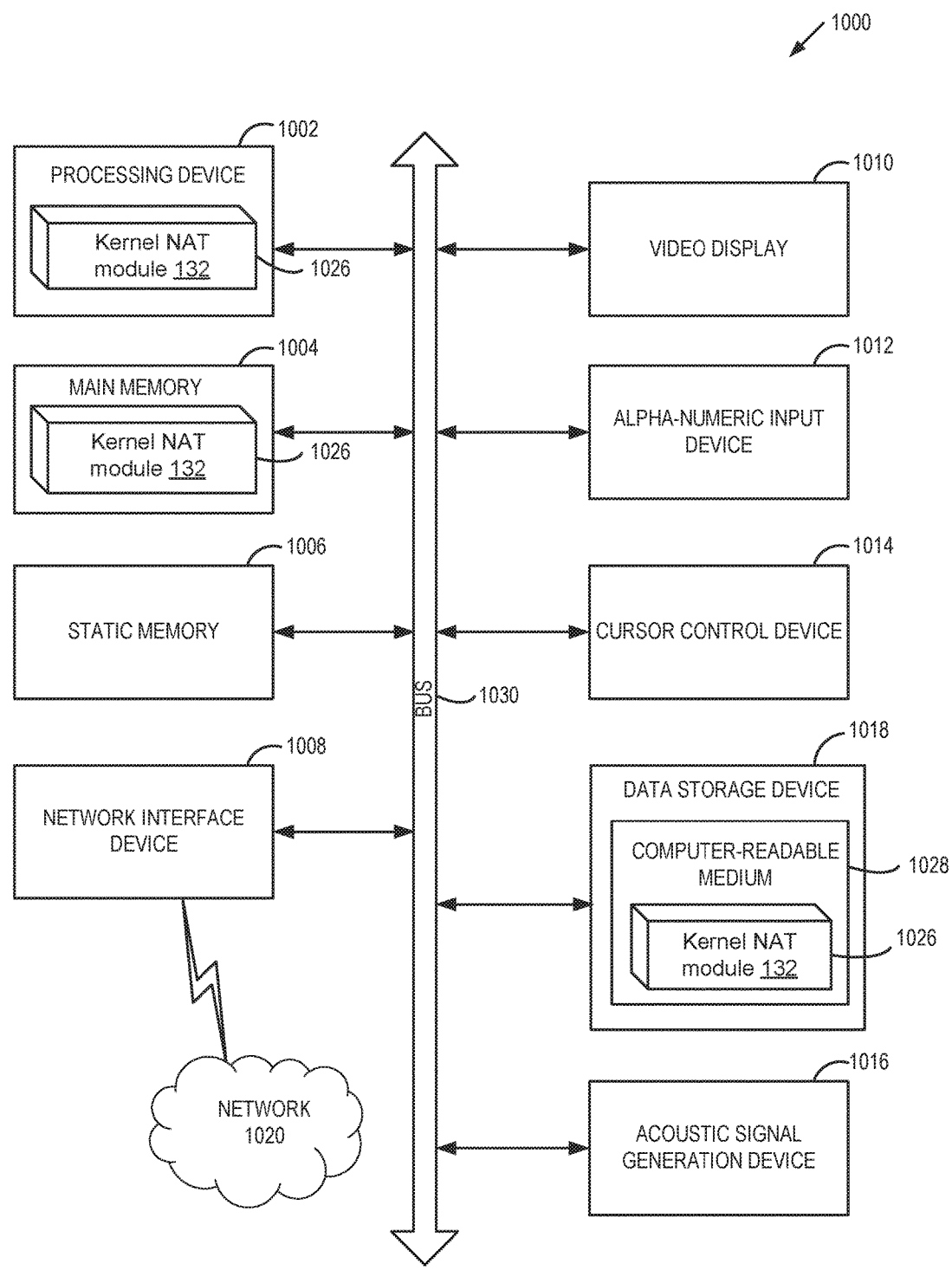
FIG. 4 depicts a block diagram of an example computer system operating in accordance with one or more aspects of the present disclosure.

FIG. 4 schematically illustrates a component diagram of an example computer system 1000 which can perform any one or more of the methods described herein. In various illustrative examples, computer system 1000 may represent router 130 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute kernel mode NAT module 132 implementing method 300 for routing traffic between networks governed by different Internet Protocol (IP) versions.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of kernel mode NAT module 132 implementing method 300 for routing traffic between networks governed by different Internet Protocol (IP) versions.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
    receiving, by a processor executing a kernel space network layer address translation module, a network packet having an original source address defined in a first address space and an original destination address defined in the first address space, wherein the first address space is associated with a first Open Systems Interconnection (OSI) network layer protocol;
    identifying, using a network layer address mapping transformation, a substitute destination address associated with the original destination address, wherein the substitute destination address is defined in a second address space associated with a second OSI network layer protocol, and wherein the substitute destination address comprises a concatenation of a pre-defined prefix, the original destination address, and a pre-defined suffix;
    substituting the original destination address of the network packet with the substitute destination address;
    selecting, from a pool of available network layer addresses defined in the second address space, a substitute source address;
    associating, by a record of a memory data structure, the original source address and the substitute source address;
    substituting the original source address of the network packet with the substitute source address;
    causing the network packet to be transmitted to a destination host identified by the substitute destination address;
    receiving a domain name system (DNS) request specifying a DNS name associated with the destination host;
    transmitting a DNS response specifying the substitute destination address; and
    responsive to detecting a Transmission Control Protocol (TCP) event associated with the substitute source address, purging the record from the memory data structure.

2. The method of claim 1, wherein the first OSI network layer protocol is provided by Internet Protocol version 4 (IPv4).

3. The method of claim 1, wherein the second OSI network layer protocol is provided by Internet Protocol version 6 (IPv6).

4. The method of claim 1, further comprising:
    receiving, via a graphical user interface (GUI) of a user space module, a parameter of the network address mapping transformation.

5. The method of claim 1, further comprising:
receiving, via an application programming interface (API) of a user space module, a parameter of the network address mapping transformation.

6. The method of claim 1, further comprising:
receiving a response packet having a source address matching the substitute destination address and further having a destination address matching the substitute source address;
substituting, in the response packet, the source address with the original destination address;
substituting, in the response packet, the destination address with the original source address; and
causing the network packet to be transmitted to a source host identified by the original source address.

7. A system, comprising:
a memory; and
a processor, coupled to the memory, the processor to:
receive, by a kernel space network layer address translation module, a network packet having an original source address defined in a first address space and an original destination address defined in the first address space, wherein the first address space is associated with a first Open Systems Interconnection (OSI) network layer protocol;
identify, using a network layer address mapping transformation, a substitute destination address associated with the original destination address, wherein the substitute destination address is defined in a second address space associated with a second OSI network layer protocol, and wherein the substitute destination address comprises a concatenation of a pre-defined prefix, the original destination address, and a pre-defined suffix;
substitute the original destination address of the network packet with the substitute destination address;
select, from a pool of available network layer addresses defined in the second address space, a substitute source address;
associate, by a record of a memory data structure, the original source address and the substitute source address;
substitute the original source address of the network packet with the substitute source address;
cause the network packet to be transmitted to a destination host identified by the substitute destination address;
receive a domain name system (DNS) request specifying a DNS name associated with the destination host;
transmit a DNS response specifying the substitute destination address; and
responsive to detecting a Transmission Control Protocol (TCP) event associated with the substitute source address, purge the record from the memory data structure.

8. The system of claim 7, wherein the first OSI network layer protocol is provided by Internet Protocol version 4 (IPv4).

9. The system of claim 7, wherein the second OSI network layer protocol is provided by Internet Protocol version 6 (IPv6).

10. The system of claim 7, wherein the processor is further to: receive, via a graphical user interface (GUI) of a user space module, a parameter of the network address mapping transformation.

11. The system of claim 7, wherein the processor is further to: receive, via an application programming interface (API) of a user space module, a parameter of the network address mapping transformation.

12. The system of claim 7, wherein the processor is further to:
receive a response packet having a source address matching the substitute destination address and further having a destination address matching the substitute source address;
substitute, in the response packet, the source address with the original destination address;
substitute, in the response packet, the destination address with the original source address; and
cause the network packet to be transmitted to a source host identified by the original source address.

13. A non-transitory computer-readable storage medium having thereon executable instructions that, when executed by a processor, cause the processor to:
receive, by a kernel space network layer address translation module, a network packet having an original source address defined in a first address space and an original destination address defined in the first address space, wherein the first address space is associated with a first Open Systems Interconnection (OSI) network layer protocol;
identify, using a network layer address mapping transformation, a substitute destination address associated with the original destination address, wherein the substitute destination address is defined in a second address space associated with a second OSI network layer protocol, and wherein the substitute destination address comprises a concatenation of a pre-defined prefix, the original destination address, and a pre-defined suffix;
substitute the original destination address of the network packet with the substitute destination address;
substitute the original source address of the network packet with a substitute source address;
associate, by a record of a memory data structure, the original source address and the substitute source address;
cause the network packet to be transmitted to a destination host identified by the substitute destination address;
receive a domain name system (DNS) request specifying a DNS name associated with the destination host;
transmit a DNS response specifying the substitute destination address; and
responsive to detecting a Transmission Control Protocol (TCP) event associated with the substitute source address, purge the record from the memory data structure.

14. The non-transitory computer-readable storage medium of claim 13, wherein the first OSI network layer protocol is provided by Internet Protocol version 6 (IPv6).

15. The non-transitory computer-readable storage medium of claim 14, wherein the second OSI network layer protocol is provided by Internet Protocol version 4 (IPv4).

16. The non-transitory computer-readable storage medium of claim 14, further comprising executable instructions to cause the processor to:
receive a response packet having a source address matching the substitute destination address and further having a destination address matching the substitute source address;
substitute, in the response packet, the source address with the original destination address;

substitute, in the response packet, the destination address with the original source address; and cause the network packet to be transmitted to a source host identified by the original source address.

\* \* \* \* \*